United States Patent
Park et al.

(10) Patent No.: US 10,043,163 B2
(45) Date of Patent: Aug. 7, 2018

(54) METHOD FOR CONTROLLING FINANCIAL CHIP OF PAYMENT DEVICE

(71) Applicants: Shinhancard Co., Ltd., Seoul (KR); KB Kookmincard Co., Ltd., Seoul (KR); Hyundai Card Co., Ltd., Seoul (KR); Samsung Card Co., Ltd., Seoul (KR); Lotte Card Co., Ltd., Seoul (KR); Nonghyup Bank, Seoul (KR)

(72) Inventors: Hae Chul Park, Seoul (KR); Byungsoo Kim, Seoul (KR); Jeongjin Lee, Seoul (KR)

(73) Assignees: SHINHANCARD CO., LTD., Seoul (KR); KB KOOKMINCARD CO., LTD., Seoul (KR); HYUNDAI CARD CO., LTD., Seoul (KR); SAMSUNG CARD CO., LTD., Seoul (KR); LOTTE CARD CO., LTD., Seoul (KR); NONGHYUP BANK, Seoul (KR)

( * ) Notice: Subject to any disclaimer, the term of this patent is extended or adjusted under 35 U.S.C. 154(b) by 475 days.

(21) Appl. No.: 14/655,637

(22) PCT Filed: Dec. 28, 2012

(86) PCT No.: PCT/KR2012/011679
§ 371 (c)(1),
(2) Date: Jun. 25, 2015

(87) PCT Pub. No.: WO2014/104433
PCT Pub. Date: Jul. 3, 2014

(65) Prior Publication Data
US 2015/0339642 A1    Nov. 26, 2015

(30) Foreign Application Priority Data
Dec. 26, 2012    (KR) .......................... 10-2012-0152919

(51) Int. Cl.
*G06Q 20/10*    (2012.01)
*G06Q 20/24*    (2012.01)
(Continued)

(52) U.S. Cl.
CPC ........... *G06Q 20/105* (2013.01); *G06Q 20/24* (2013.01); *G06Q 20/3229* (2013.01);
(Continued)

(58) Field of Classification Search
CPC ...... G06Q 40/00; G06Q 20/40; G06Q 20/105; G06Q 20/24; G06Q 20/3229;
(Continued)

(56) References Cited

U.S. PATENT DOCUMENTS

| 6,125,349 A * | 9/2000 | Maher .................... G06Q 20/00 705/1.1 |
| 6,216,015 B1 * | 4/2001 | Hymel ............... G06Q 20/3552 455/558 |

(Continued)

FOREIGN PATENT DOCUMENTS

| KR | 102009008171 | 7/2009 |
| KR | 102010013185 | 12/2010 |

(Continued)

OTHER PUBLICATIONS

International Search Report for PCT/KR2012/011679 dated Aug. 19, 2014.

*Primary Examiner* — Lalita M Hamilton
(74) *Attorney, Agent, or Firm* — Locke Lord LLP; Christopher J. Capelli; Judy R. Naamat (57) ABSTRACT

Disclosed is a method for controlling a financial chip of a payment device, in which information for multiple cards is stored in a single USIM chip, to enable the payment device to use credit cards from multiple card companies as a payment means. The method includes: dividing storage of (Continued)

the memory of the financial chip into multiple sections and allocating a turn to each storage section; allocating a first turn to the first card company server and recording information on the credit card issued by the first card company server, an application for financial transactions, and an identifier for the application when the first card company server and the second card company server sequentially make a request for the record of credit card information to the financial chip; and providing card arrangement information including information on the first turn and a second turn to the second card company server.

11 Claims, 5 Drawing Sheets

(51) Int. Cl.
  *G06Q 20/34* (2012.01)
  *G06Q 20/32* (2012.01)
  *G06Q 20/38* (2012.01)

(52) U.S. Cl.
  CPC ....... *G06Q 20/341* (2013.01); *G06Q 20/3572* (2013.01); *G06Q 20/3574* (2013.01); *G06Q 20/3576* (2013.01); *G06Q 20/35765* (2013.01); *G06Q 20/3829* (2013.01)

(58) Field of Classification Search
  CPC ............. G06Q 20/341; G06Q 20/3572; G06Q 20/3574; G06Q 20/3576; G06Q 20/35765; G06Q 20/3829
  See application file for complete search history.

(56) References Cited

U.S. PATENT DOCUMENTS

| | | | | |
|---|---|---|---|---|
| 6,719,634 B2* | 4/2004 | Mishina | ................ | A63F 13/02 463/42 |
| 6,805,296 B2* | 10/2004 | Sakashita | ............. | G06Q 20/341 235/380 |
| 6,945,467 B2* | 9/2005 | Kojima | ................ | G06K 19/073 235/451 |
| 8,397,058 B1* | 3/2013 | Ezawa | ................ | G06Q 20/341 380/277 |
| 8,464,958 B2* | 6/2013 | Cho | .................... | G06K 19/0719 235/380 |
| 2002/0030099 A1* | 3/2002 | Sakashita | ............. | G06Q 20/341 235/380 |
| 2004/0059685 A1* | 3/2004 | Sakamura | .............. | G06Q 10/02 705/65 |
| 2007/0118753 A1* | 5/2007 | Huque | ................ | G06Q 20/341 713/176 |
| 2007/0250920 A1* | 10/2007 | Lindsay | .................. | G06F 21/31 726/7 |
| 2009/0055893 A1* | 2/2009 | Manessis | ............... | G06Q 20/04 726/2 |
| 2012/0022973 A1* | 1/2012 | Makhotin | .............. | G06Q 20/10 705/27.1 |
| 2012/0323717 A1* | 12/2012 | Kirsch | ............... | G06Q 20/0855 705/26.1 |
| 2013/0001304 A1* | 1/2013 | Xu | ......................... | G06O 20/20 235/380 |
| 2017/0249631 A1* | 8/2017 | Colnot | .................. | H04L 9/3271 |

FOREIGN PATENT DOCUMENTS

| | | |
|---|---|---|
| KR | 102011004958 | 5/2011 |
| KR | 102012009715 | 9/2012 |

\* cited by examiner

| 1 Byte | 2 Byte | 3 Byte | 4 Byte | 5 Byte | 6 Byte | 7 Byte | 8 Byte |
|---|---|---|---|---|---|---|---|
| CARD COMPANY CODE | | Year | Month | Count | | | |

METHOD FOR CONTROLLING FINANCIAL CHIP OF PAYMENT DEVICE

TECHNICAL FIELD

The present invention generally relates to a financial chip controlling method. More particularly, the present invention relates to a method for controlling a financial chip of a payment device, which enables a financial chip embedded in a payment device for mobile payment to store information for multiple cards.

BACKGROUND ART

Smart phones, mobiles phones, and portable payment devices contain therein a financial chip, which is provided for mobile payment by finance companies (for example, card companies or banks), or a Universal Subscriber Identity Module (USIM) chip, to process mobile payment. A USIM chip has payment device holder's personal information (communication service provider information, a user password, roaming information, and a mobile terminal user's phone number) for user authentication, and forms a type of a smart card.

A USIM chip has high security because encryption techniques are applied differently from existing wireless communication methods (for example, Bluetooth, Zigbee, and RFID). Also, identification time at a close range (for example, 10 centimeters) is just 0.1 seconds, and the USIM chip is capable of bidirectional communication. Such aspects are advantageous for mobile payment using a card reader.

However, after a finance company such as a card company or a bank installs a financial application to a USIM chip, it is difficult to additionally install a financial application of another finance company in the same USIM chip. When a first finance company accesses a USIM chip using a first primary key and records card information, the primary key is changed to an issuer key issued by the first finance company. Therefore, it is difficult for another finance company to record additional card information to the USIM chip. In other words, because a USIM chip corresponds to a single finance company, a payment device such as a smart phone or a mobile phone may not use various finance companies. This will be described referring to FIG. 1.

Figure 1:
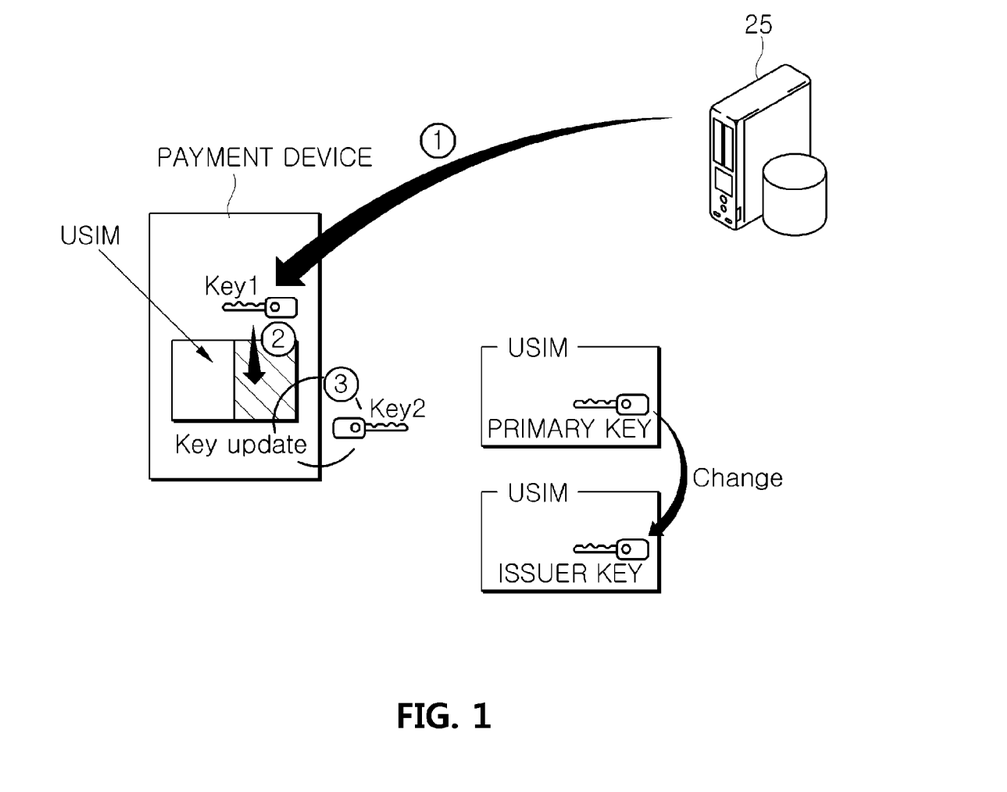
FIG. 1 illustrates a reference drawing of a method for using a conventional USIM chip embedded in a payment device.

FIG. 1 illustrates a reference drawing of a method for using a conventional USIM chip embedded in a payment device.

Referring to FIG. 1, in the case of a conventional USIM chip, a card company server 25 obtains a primary key (KEY 1) that has been set for the USIM chip, and accesses a storage area in the USIM chip using the primary key (KEY 1). The card company server 25 accesses the storage area and installs an application for financial transactions. When the application is installed, the card company server changes the first set primary key (KEY 1) to an issuer key (KEY 2). Because the issuer key (KEY 2) is not disclosed to other card companies, access to the USIM chip by servers of other card companies may be limited. In other words, a USIM chip mounted in a payment device is occupied by a single card company server 25, and a payment means of the payment device is limited by the card information provided by the corresponding card company server 25. To solve this problem, a separate smart chip shareable by multiple card companies or a smart card may be additionally mounted in the payment device. However, this may create an additional burden for the payment device. Furthermore, the usefulness of the USIM chip that is basically mounted in smart phones or mobile phones may be reduced.

DISCLOSURE

Technical Problem

An object of the present invention is to provide a method for controlling a financial chip of a payment device to improve the usefulness and security of the payment device by storing card information of multiple card companies in a single USIM chip while not damaging the security of the general-purpose USIM chip.

Technical Solution

According to the present invention, the above object is accomplished by a method for controlling a financial chip of a payment device that connects with a server of a first card company and a server of a second card company by a wireless network. The method for controlling the financial chip of the payment device includes: dividing storage of a memory of the financial chip into multiple storage areas and assigning sequence numbers to the divided storage areas; when the first card company server and the second card company server sequentially make a request for recording of credit card information to the financial chip, assigning a first sequence number to the first card company server and recording credit card information issued by the first card company server, an application for financial transactions, and an identifier for the application; and providing card arrangement information including information about the first sequence number and a second sequence number, which is the next sequence number, to the second card company server.

Advantageous Effects

According to the present invention, because information for multiple cards may be stored in a single USIM chip, a payment device may use credit cards of multiple card companies as a payment means.

<Description of the Reference Numerals in the Drawings>

<10: payment device>      <100: financial chip>
<200: card company server>

BEST MODE

A payment device mentioned herein may mean a device capable of payment in a mobile environment. As the device capable of payment in a mobile environment, there are a mobile phone, a smart phone, a laptop, a personal digital assistant (PDA), a tablet PC, and a camera. Besides, it may indicate a portable device capable of wireless communication, in which a Universal Subscriber Identity Module (USIM) chip or a financial chip that finance companies provide to substitute for the payment by credit cards is mounted. When a camera is used as a payment device, the camera contains a financial chip such as a Subscriber Identity Module (SIM) or a USIM therein. Only if a financial chip is embedded in a camera, the camera may be referred to a payment device.

"A credit card" mentioned herein may mean a payment device for substituting for a credit card, as well as a credit card itself.

Also, in a mobile environment, a payment device may mean a device that may transmit card information to a card reader through ISO 14443 and ISO 14443A, which are mobile wireless transmission standards, at a close range (for example, within 10 centimeters) though the device does not have a separate financial chip.

A financial chip mentioned herein may mean a chip that finance companies such as card companies or banks provide to a payment device for mobile payment. Such a financial chip may be provided by finance companies issuing financial chips or may be provided to a user by communication service providers that provide payment devices. On the other hand, a financial chip may indicate SIM and USIM chips that are mounted in smart phones or mobile phones to identify subscribers of communication service.

A financial chip mentioned herein performs wireless local area communication (for example, within 10 centimeters) with a card reader, using a Near Field Communication (NFC) chip, or may be implemented as a NFC USIM chip by being integrated into NFC chip. Also, a financial chip may be implemented as a Micro Secure Digital (Micro SD) chip or an Embedded Secure Element (Embedded SE) chip.

Hereinafter, referring to the drawings, the present invention is described in detail.

Figure 2:
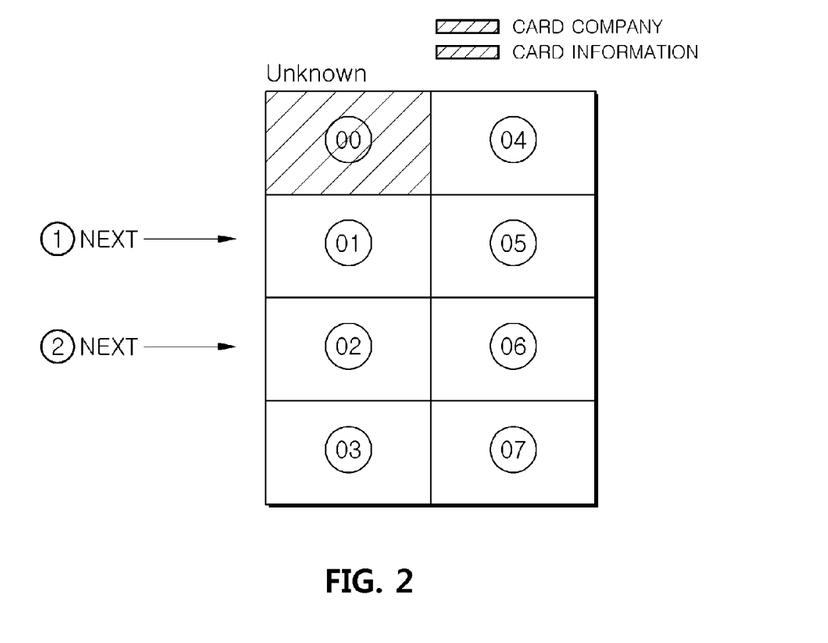
FIG. 2 illustrates a concept diagram of a method for controlling a financial chip of a payment device, according to an embodiment of the present invention.

FIG. 2 illustrates a concept diagram of a method for controlling a financial chip of a payment device, according to an embodiment of the present invention.

A method for controlling a financial chip of a payment device, according to the embodiment (hereinafter, referred to a financial chip controlling method) divides unused storage of a memory of a financial chip 100 into multiple areas and assigns a sequence number to each of the divided storage areas. In FIG. 2, an example in which the sequence numbers from 00 to 07 are assigned to the storage areas is illustrated.

When a card company server first accesses the financial chip 100 to issue card information, the foremost sequence number among the given sequence numbers, for example, the sequence number "00" is accessed. As a result, an application for financial transactions is installed in the storage area corresponding to the sequence number "00", and an application ID for the application may be assigned to the financial chip 100.

After that, when another card company server intends to access the financial chip 100 to issue card information, the payment device may assign the next sequence number of the sequence number used in the financial chip 100, for example, the sequence number "01". In this case, the card company server may not determine which card company accesses the first sequence number "00" and records card information. The card company knows only that the first sequence number is used, and is allocated a storage area of the next sequence number.

Similarly, when other card company server intends to access the financial chip and to issue card information, the payment device assigns the next sequence number ("02") of the used sequence number (for example, the sequence number "01") in the financial chip 100 to record the card information.

An application ID assigned to the financial chip 100 is issued by the first card company server that issues the card information by first accessing the financial chip 100. The form of the application ID may comprise a card company code, the year, the month, and a count value. The application ID is described referring to FIG. 3.

Figure 3:
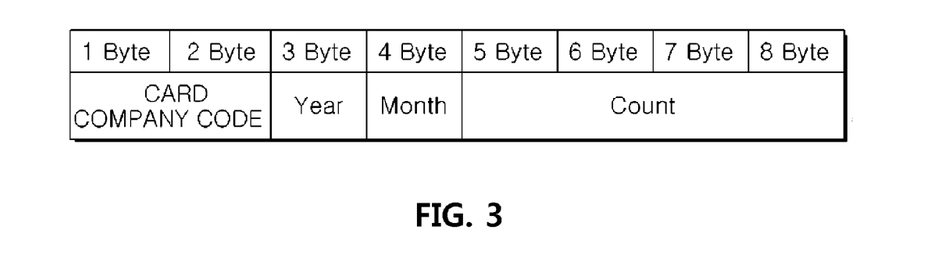
FIG. 3 illustrates a reference drawing of an example of an application ID.

Referring to FIG. 3, an application ID is generated by a card company that first accesses a financial chip 100 and issues card information, and then the application ID is assigned to the financial chip 100. The application ID may consist of 8 bytes. Here, the first position for the card company code has 2 bytes, and 1 byte, 1 byte and 4 bytes may be respectively allocated to the year, the month, and the count value.

If a card company code assigned to a certain card company is 0x1234, the application issuing date is Oct. 10, 2012, and the count value is 0x00, the application ID may be formed by joining the card company code (0x1234), the year (0x12), the month (0x10), and the count value (0x00). In other words, the application ID according to the above-mentioned condition is represented as "0x1234 0x12 0x10 0x00".

The application ID indicates an identifier of an application for financial transactions, which is provided to a financial chip 100 by a card company server. Only one application ID is assigned to the financial chip 100. This is because different card company servers generate derivation keys using the application ID and record the derivation keys in the same financial chip.

Several card company servers may generate the different derivation keys using a common encryption rule, and record the generated derivation keys in the financial chip 100.

If card company servers each generate the derivation keys using different algorithms, programs for implementing the different algorithms should be installed in the financial chip 100 for each of the card company servers. In the present embodiment, the same derivation key is used by card companies, but by enabling the card companies to generate different derivation keys using the same application ID, a method for effectively using storage of the financial chip 100 may be provided.

For each card company server, a derivation key, generated in the payment device by an encryption algorithm using "card company code|application ID" as a parameter, may be recorded in a storage area of the financial chip 100. Each storage area may have a sequence number (for example, "00" to "07"), and each card company server may record its derivation key and card information in the storage area according to the sequence number. In this case, because each card company server accesses the storage area depending on the sequence number assigned by the payment device and records the derivation key and the card information in the storage area, it is unknown of which card company server the derivation key and the card information are recorded in the financial chip 100.

Each card company server completes issuance of a card by the processes of accessing the sequence number assigned by the payment device, generating a derivation key, and recording the generated derivation key and the card information.

Figure 4:
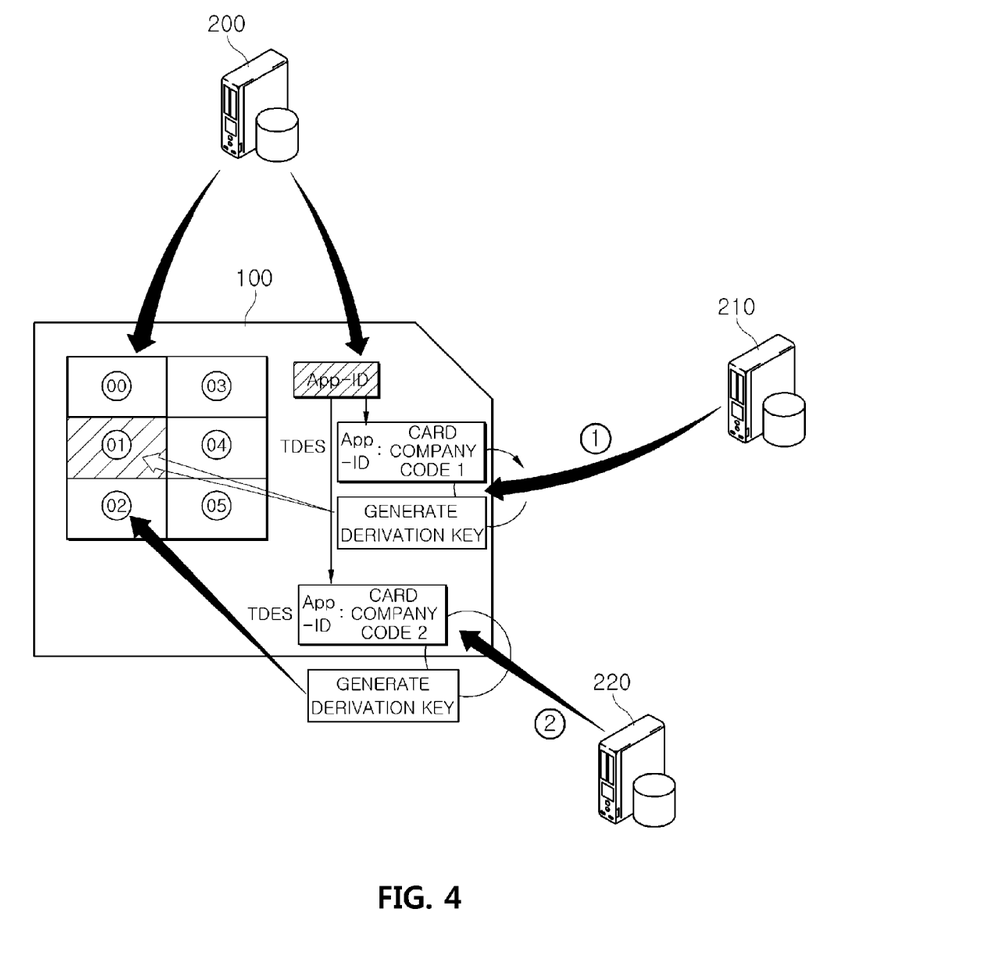
FIG. 4 illustrates a concept diagram of an example of a method for generating a derivation key.

These processes are described referring to FIG. 4.

Referring to FIG. 4, an example in which derivation keys are generated using one derivation key generating algorithm for card company servers 210 and 220 is illustrated.

If a card company server 200 is the first server that accesses a financial chip 100 and issues an application ID to a storage area corresponding to a first sequence number (00) of the financial chip 100, another card company server having a reference numeral "210" is the second card company server accessing the financial chip 100 and other card company server having a reference numeral "220" may correspond to the third card company server accessing the financial chip 100.

Based on the above-mentioned condition, a process for generating a derivation key is described as follows.

A first derivation key may be generated by executing an encryption algorithm using both the application ID that is issued to the financial chip 100 by the first card company server 200 and a card company code contained in the card company server 200 as parameters. In this case, an encryption algorithm such as Advanced Encryption Standard (AES), Rivest Shamir Adleman (RSA), Data Encryption Standard (DES), Triple DES (TDES), and Academy Research Institute Agency (ARIA) may be used, but preferably, the encryption algorithm may be TDES algorithm in which the same derivation key is not generated when any one of the encryption parameters is different. In the present embodiment, the first derivation key generated by the card company server 200 may be used to generate the second derivation key and the third derivation key by the card company servers 210 and 220.

The second card company server 210 may generate the second derivation key using the first derivation key, which is generated by the first card company server 200, the card company code for the card company server 200, and the application ID. Here, the application ID is assigned to the financial chip 100 by the first card company server 200, and the first derivation key is also generated by the first card company server 200. In other words, the second card company server 210 generates the second derivation key by the encryption algorithm that uses the first derivation key and the application ID, which are generated by the first card company server 200, as parameters. In this case, the generated derivation key is stored in the second storage area (01), and the finance company server 210 does not know which company server accesses the first storage area (00) and which derivation key is stored therein. Likewise, the third card company server 220 that accesses the financial chip 100 also does not know which storage area the derivation keys of the first card company server and the second card company server 210 are stored in. This is because both the second card company server 210 and the third card company server 220 are assigned available sequence numbers and record the derivation key and card information according to the sequence numbers. After the derivation key and the card information are recorded in the financial chip 100, the second card company server 210 and the third card company server 220 do not install an additional application in the financial chip 100.

All the card company servers 200, 210, and 220 accessing the financial chip 100 may use the same encryption algorithm. Desirably, TDES algorithm is used and the card company servers 200, 210, and 220 may generate derivation keys of the card company servers (for example, reference numerals 200, 210, and 220) using the same encryption algorithm.

A derivation key may be obtained by executing TDES algorithm which has parameters including a derivation key issued by the card company server 200 first accessing the financial chip 100, an application ID, a sequence number, and a card company code of a card company server 210 or 220 that accesses the financial chip 100.

In other words, a derivation key assigned to the third card company server 220, which is the third derivation key, may be generated using both the application ID and the first derivation key issued by the card company server 200 accessing the first sequence number (00), and the card company servers 200, 210 and 220 may use the same encryption algorithm (for example, TDES algorithm).

TDES algorithm outputs different values when any input parameter is changed. Therefore, the derivation key value of the third card company server 220 is different from that of the first card company server 200 and the second card company server 210 due to the difference between the sequence numbers stored in the financial chip 100.

Figure 5:
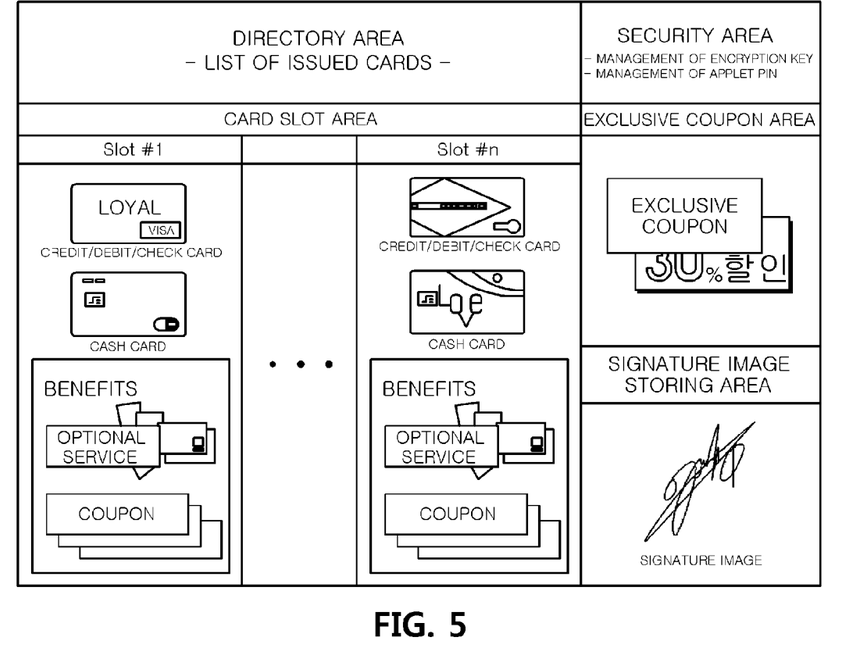
FIG. 5 illustrates a reference drawing for comparing between a financial chip controlling method according to the present invention and a conventional financial chip controlling method.

FIG. 5 illustrates a reference drawing for comparing between the financial chip controlling method according to the present invention and a conventional financial chip controlling method.

FIG. 5 illustrates a structure diagram of a card application for a payment method using a mobile terminal, which is disclosed by Korean Patent Application Publication 10-2012-0047721.

Referring to FIG. 5, the Korean Patent Application Publication 10-2012-0047721 suggests that a card application having multiple slots store multiple mobile cards in the multiple slots, respectively, activate one mobile card among the multiple mobile cards, and extract payment information from the activated mobile card. In comparison with conventional payment methods, Korean Patent Application Publication 10-2012-0047721 is advantageous because multiple mobile cards may be stored in a financial chip such as SIM and USIM. However, only through one card company server providing a card application, card information of other card companies may be stored in the financial chip. This means that card company servers may not record desired card information in a payment device.

In other words, card information may be recorded in the financial chip only through a card company server providing a card application, and servers of the other card companies should request that the card company server providing the card application issue their card information and record it. This means that the other card companies may not individually access the financial chip, and the other card companies are subordinate to the card company issuing the card application.

On the contrary, the present invention allows multiple card company servers to record card information and to share storage in a USIM chip that is basically mounted in a payment device such as a smart phone and a mobile phone. Furthermore, multiple card company servers share storage of a single financial chip (USIM chip), but do not know other card companies having card information recorded in the storage. As a result, the card company servers each may use the financial chip 100 as if they are allocated an individual storage area. The financial chip 100 only tells the card company servers a sequence number of the storage area to be used.

Consequently, card company servers each may individually access a financial chip 100, and do not depend on any one card company server.

Figure 6:
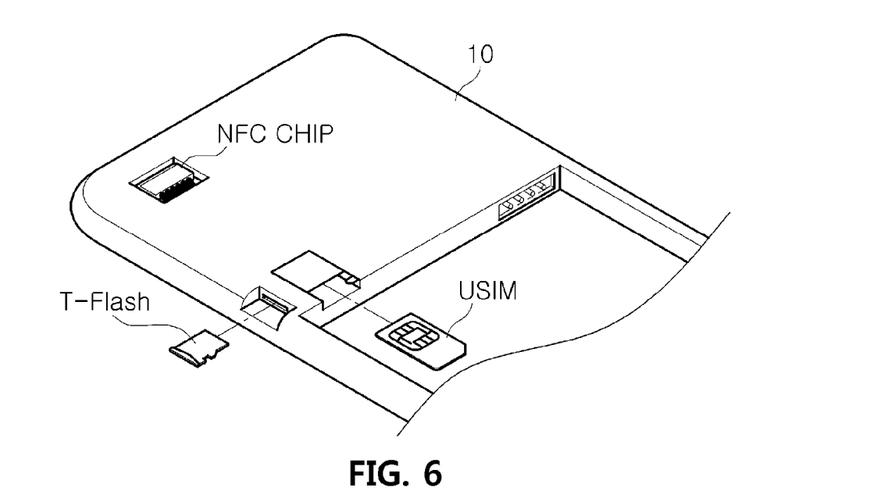
FIG. 6 illustrates a reference drawing of an arrangement in which a financial chip is mounted in a payment device.

FIG. 6 illustrates a reference drawing of an arrangement in which a financial chip is mounted in a payment device.

Referring to FIG. 6, a financial chip may be a USIM chip that is mounted in a payment device 10 such as a smart phone or a mobile phone. A USIM chip has a form of a smart card inserting into the inner part of the payment device 10, and may perform wireless data communication with a card reader, which reads card information from a credit card by interconnecting with an NFC chip embedded in the payment device 10, at a close distance (for example, within 10 centimeters). The payment device performs data communication with card company servers 200, 210, and 220, described in FIGS. 2 to 5, using a long-distance wireless communication method such as CDMA or GSM, and may perform wireless local area communication with the card reader using the NFC chip.

FIG. 6 illustrates that an NFC chip is disposed separate from a USIM chip in the payment device 10. However, a financial chip (USIM) may be integrated into an NFC chip, and a micro SD chip or an embedded SE may be used as a financial chip. The financial chip is not limited to the above examples.

Figure 7:
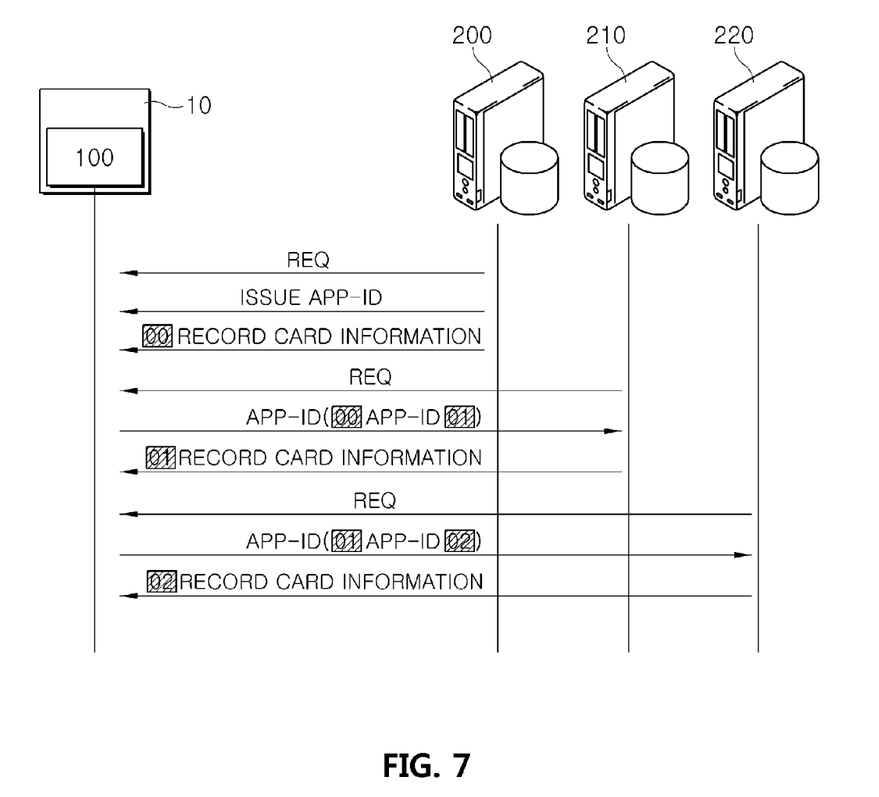
FIG. 7 illustrates a flow diagram of a method for controlling a financial chip of a payment device, according to an embodiment of the present invention.

FIG. 7 illustrates a flow diagram of a method for controlling a financial chip of a payment device, according to an embodiment of the present invention.

Referring to FIG. 7, a method for controlling a financial chip of a payment device, according to an embodiment, is performed by the following processes. A card company server 200 first accesses a financial chip 100 to issue card information, inquires whether another card company server has issued card information to the financial chip 100, and requests access to the financial chip 100. When there is not another card company server issuing card information to the financial chip 100, the first card company server 200 installs an application for financial transactions in the financial chip 100, and assigns a unique application ID to the financial chip 100 as described in FIG. 3.

In this case, the payment device 10 divides storage of the financial chip 100 into multiple storage areas, and assigns sequence numbers to the divided storage areas. When the assigned sequence numbers are 00, 01, 02, . . . , the payment device allows card information and a derivation key of the card company server 200 to be recorded in the storage area of the first sequence number 01.

Next, the second card company server 210 accesses the financial chip 100 of the payment device 10, and inquires whether another card company has issued card information to the financial chip 100. In this case, the payment device 10 having the financial chip 100 may inform the card company server 210 that another card company server 200 has issued its card information to the financial chip 100. After that, the payment device 10 may inform the card company server 210 of card arrangement information including sequence numbers of storage areas in which card information are recorded and a sequence number of a next available storage area. The card arrangement information may include an application ID, the sequence number allocated to the card company server 200, and a next sequence number that may be used by the card company server 210.

For example, the card company server 200 occupies the storage area corresponding to the sequence number "00" among the storage areas of the financial chip 100, card arrangement information including the sequence number "00", the application ID, and the sequence number "01" may be notified to the card company server 210. The card company server 210 accesses the storage area of the sequence number "01", records the card information, and may generate a secondary derivation key using a derivation key generated in the first card company server 200 accessing the financial chip 100. The secondary derivation key may be generated by the card company servers 200, 210, and 220, using the same encryption algorithm (for example, TDES algorithm) allowable in the financial chip 100.

Next, when the card company server 220 thirdly intends to record card information in the financial chip 100, like the above-described card company server 210, the card company server 220 inquires of the payment device 10 whether other card company servers 200 and 210 have recorded card information in the financial chip 100, and is notified that other card company servers 200 and 210 occupy the storage areas corresponding to the sequence numbers "00" and "01", respectively, among the storage areas of the financial chip 100. The card company server 220 receives card arrangement information including the last occupied sequence number "01", a next available sequence number "02", and an application ID shared by other card company servers 200 and 210 from the payment device 10; accesses a storage area corresponding to the sequence number "02" in the financial chip 100 and records the card information; and may record a derivation key in the storage area corresponding to the sequence number "02", the derivation key being generated in the financial chip 100 of the payment device 10, using the shared application ID and an encryption algorithm.

INDUSTRIAL APPLICABILITY

The present invention provides a method in which information for multiple cards is stored in a single financial chip and security of the card information may be improved. The present invention may contribute to expansion of financial companies processing financial transactions using a financial chip, such as credit card companies or banks, and expansion of communication service providers supporting the issuance of a mobile card of financial companies.

The invention claimed is:

1. A method for controlling a financial chip of a payment device, the method being performed by a hardware processor of the payment device that connects using long-distance wireless communication with a server of a first card company and a server of a second card company by a wireless network, the method comprising:
dividing storage of a memory of the financial chip into multiple storage areas and assigning different sequence numbers to the respective divided storage areas;
receiving, via the wireless network using the long-distance wireless communication, a first request and first credit card information from the first card company server for recording of the first credit card information to the financial chip;
assigning a first sequence number of the assigned sequence numbers to the first card company server;
recording the first credit card information, an application for financial transactions issued by the first card company server, and an identifier for the application in a first storage area of the multiple storage areas identified by the first sequence number;

receiving a first derivation key generated by the first card company server using the identifier for the application, the first sequence number, and a card company code for the first card company server;

recording the first derivation key in the first storage area;

receiving, via the wireless network using the long-distance wireless communication, a second request and second credit card information from the second card company server for recording of the second credit card information to the financial chip;

providing via the wireless network using the long-distance wireless communication card arrangement information including information about the first sequence number, the first derivation key, and a second sequence number that identifies a second storage area of the multiple storage areas, the second sequence number being the next sequence number to the first sequence number, to the second card company server;

receiving a second derivation key generated by the second card company server using the first derivation key and the second sequence number; and recording the second derivation key and the second credit card information in the second storage area as available for provision to a third card company server.

2. The method of claim 1, wherein the card arrangement information includes the identifier of the application, said identifier being issued by the first card company.

3. The method of claim 2, wherein the second card company server accesses the second storage area corresponding to the second sequence number.

4. The method of claim 2, wherein the card arrangement information provides the identifier issued by the first card company to the second card company server.

5. The method of claim 1, wherein the identifier, and a used sequence number and an unused sequence number among the sequence numbers are comprised in the card arrangement information, the identifier being fixed as the identifier of the first card company server that first accesses the storage area.

6. The method of claim 5, wherein in the card arrangement information, the used sequence number and the unused sequence number are successive numbers.

7. The method of claim 1, wherein the financial chip is any one of USIM (Universal Subscriber Identity Module), NFC (Near Field Communication) USIM, Micro SD (Micro Secure Digital), and Embedded SE (Embedded Secure Element).

8. The method of claim 1, wherein the first card company server generates the first derivation key by an encryption algorithm using the identifier for the application, the first sequence number, and a card company code for the first card company server, as a parameter.

9. The method of claim 8, wherein the second card company server generates the second derivation key by the encryption algorithm using the identifier for the application and the first derivation key as parameters.

10. The method of claim 1, wherein the card arrangement information includes information about a used sequence number and an unused sequence number among the sequence numbers of the storage of the memory.

11. The method of claim 1, wherein the payment device is any one of a mobile phone, a smart phone, a tablet PC, and a camera.

* * * * *